(12) United States Patent
Li et al.

(10) Patent No.: US 12,467,072 B2
(45) Date of Patent: Nov. 11, 2025

(54) METHOD OF IMPROVING BIOMASS HIGH-SOLID ENZYMATIC HYDROLYSIS RATE

(71) Applicants: ZHEJIANG HUAKANG PHARMACEUTICAL CO., LTD., Quzhou (CN); ZHEJIANG UNIVERSITY OF TECHNOLOGY, Hangzhou (CN)

(72) Inventors: Mian Li, Santa Clara, CA (US); Zhiqian Liu, Quzhou (CN); Xuhao Zeng, Quzhou (CN); Changhui Hu, Quzhou (CN); Jing Wang, Quzhou (CN); Xue Cai, Quzhou (CN); Xiaojian Zhang, Quzhou (CN); Yuguo Zheng, Quzhou (CN)

(73) Assignees: Zhejiang Huakang Pharmaceutical Co., Ltd., Quzhou (CN); Zhejiang University of Technology, Hangzhou (CN)

( * ) Notice: Subject to any disclaimer, the term of this patent is extended or adjusted under 35 U.S.C. 154(b) by 448 days.

(21) Appl. No.: 18/023,067

(22) PCT Filed: Nov. 30, 2021

(86) PCT No.: PCT/CN2021/134584
§ 371 (c)(1),
(2) Date: Feb. 24, 2023

(87) PCT Pub. No.: WO2022/116978
PCT Pub. Date: Jun. 9, 2022

(65) Prior Publication Data
US 2023/0295677 A1    Sep. 21, 2023

(30) Foreign Application Priority Data
Dec. 4, 2020    (CN) .......................... 202011403739.9

(51) Int. Cl.
*C12P 19/14*    (2006.01)
*C12N 9/42*    (2006.01)

(52) U.S. Cl.
CPC ............ *C12P 19/14* (2013.01); *C12N 9/2437* (2013.01); *C12Y 302/01004* (2013.01); *C12P 2201/00* (2013.01)

(58) Field of Classification Search
CPC ................................ C12P 19/14; C12N 9/2437
See application file for complete search history.

(56) References Cited

U.S. PATENT DOCUMENTS

| | | | |
|---|---|---|---|
| 11,421,256 B2 * | 8/2022 | Smits .................. | C12P 7/10 |
| 2015/0118349 A1 | 4/2015 | Cecava et al. | |

FOREIGN PATENT DOCUMENTS

| | | |
|---|---|---|
| CN | 101514349 | 8/2009 |
| CN | 104334030 | 2/2015 |
| CN | 104357490 | 2/2015 |
| CN | 104694587 | 6/2015 |
| CN | 112458127 | 3/2021 |

OTHER PUBLICATIONS

International Search Report and Written Opinion in International Appln. No. PCT/CN2021/134584, mailed on Feb. 17, 2022, 13 pages (submitted with machine/English translation).

* cited by examiner

*Primary Examiner* — Tekchand Saidha
(74) *Attorney, Agent, or Firm* — Fish & Richardson P.C.

(57) ABSTRACT

The present invention provides a method of improving a biomass high-solid enzymatic hydrolysis rate. By screening particle sizes of the biomass substrate, different water content controls are performed on coarse and fine particle biomass substrates and then an entire water content of the mixture of the coarse and fine particle biomass substrates is controlled to achieve a reduced initial viscosity of the enzymatic hydrolysis and improve liquefaction speed, and finally improve the biomass high-solid enzymatic hydrolysis rate. The enzymatic hydrolysis system of the present invention can be easily constructed with lower equipment requirements, lower energy consumption, higher enzymatic hydrolysis efficiency and simpler operation process, helping the industrial production and applications.

5 Claims, 1 Drawing Sheet

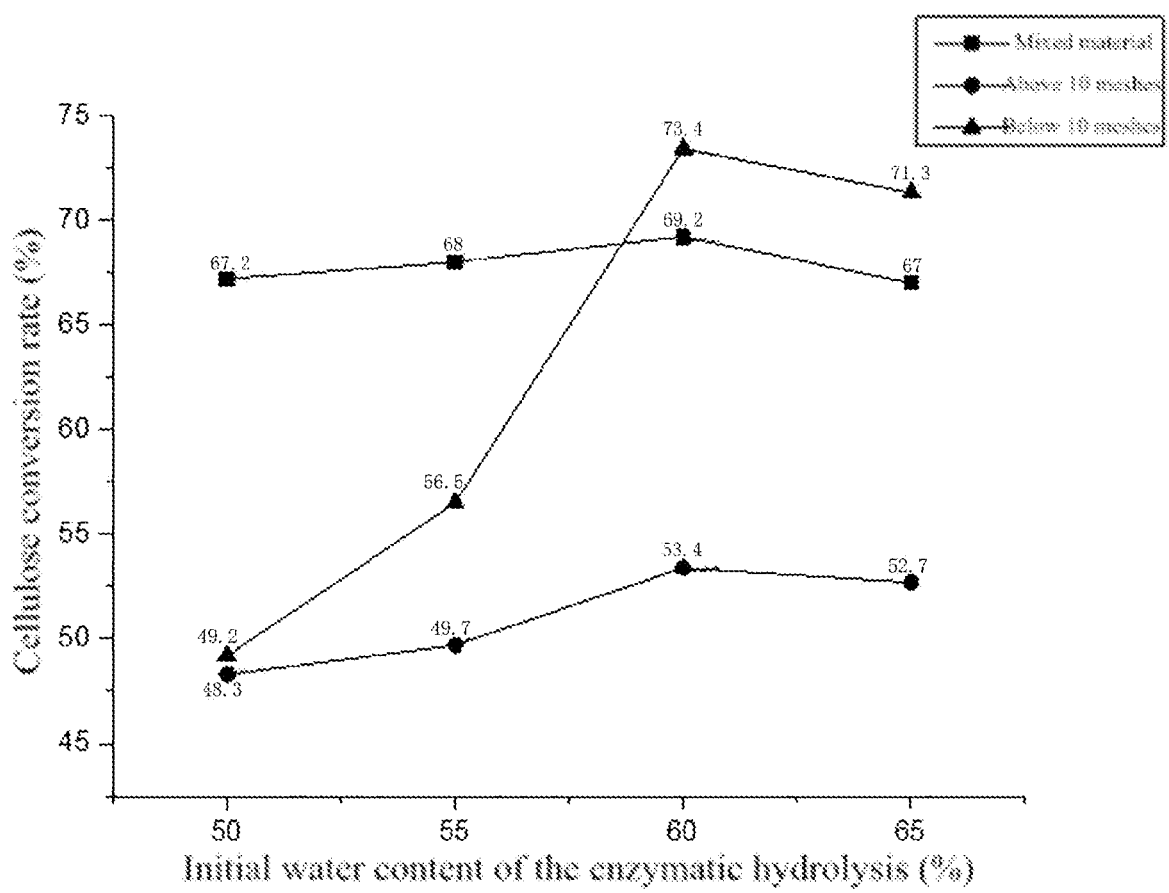

METHOD OF IMPROVING BIOMASS HIGH-SOLID ENZYMATIC HYDROLYSIS RATE

CROSS REFERENCE TO RELATED APPLICATIONS

This application is a U.S. national phase filing under 35 U.S.C. § 371 of International Application No. PCT/CN2021/134584, filed Nov. 30, 2021, which claims priority from Chinese Application No. 202011403739.9, filed Dec. 4, 2020. The contents of the prior applications are incorporated herein by reference in their entirety.

TECHNICAL FIELD

The present invention relates to the field of sugar alcohol preparation technologies, and in particular to a method of improving a biomass high-solid enzymatic hydrolysis rate.

BACKGROUND

Fuels such as ethanol developed with biomass resource are one of hot research topics of the current green new energy. The energy development mainly involves three steps: pretreatment, enzymatic hydrolysis and fermentation. The enzymatic hydrolysis is to convert cellulose and hemicellulose in lignocellulose to fermentable sugar to be used in subsequent fermentation for production of ethanol. A cellulose conversion rate of the enzymatic hydrolysis and a glucose concentration of the enzymatic hydrolysate are important factors for evaluating the enzymatic hydrolysis efficiency.

In an enzymatic hydrolysis of low substrate content, the cellulose conversion rate is high but the glucose concentration of the enzymatic hydrolysate is low, which is unfavorable for industrial production and applications; in an enzymatic hydrolysis of high substrate content, the glucose concentration of the enzymatic hydrolysate is high but the cellulose conversion rate is low. Further, an initial system viscosity of the enzymatic hydrolysis is large, resulting in high requirements on enzymatic hydrolysis equipment and low enzymatic hydrolysis efficiency. The patent with the publication number CN110343727A discloses a method and a system for continuous enzymatic hydrolysis of a high solid content of a biomass raw material, in which the operability of high-solid enzymatic hydrolysis is increased by increasing equipment performance. But, the system is complex and requires a multi-stage conveying equipment, leading to high energy consumption. The patent with the publication number CN110157755A discloses a method for sugar production of high-solid enzymatic hydrolysis of an agricultural and forestry biomass, where the enzymatic hydrolysis efficiency is increased with assistance of batch feed and surfactant. But this method is complex in operation process. Therefore, the existing technology is to be further improved.

SUMMARY

In order to solve the above technical problems, the present invention provides a simple and feasible method of improving a biomass high-solid enzymatic hydrolysis rate.

The present invention is implemented by providing a method of improving a biomass high-solid enzymatic hydrolysis rate, which includes the following steps:

at step 1, obtaining a biomass substrate with a water content of 50% to 70% by performing pretreatment on a biomass raw material, and screening the biomass substrate through a mesh screen to obtain a coarse-particle biomass substrate above 10 meshes and a fine-particle biomass substrate below 10 to 50 meshes;

at step 2, adjusting a water content of the fine-particle biomass substrate to 60% to 65% and a water content of the coarse-particle biomass substrate to 50% to 70%, and mixing the fine-particle biomass substrate and coarse-particle biomass substrate having different water contents to control a water content of the mixed substrate to 50% to 65%;

at step 3, placing the mixed substrate into an enzymatic hydrolysis tank, and then adding a citrate buffer solution with pH 4.6 to 5.5 and a cellulase for enzymatic hydrolysis.

When a biomass enzymatic hydrolysis system is constructed, it is required to control a water content of a material to achieve the purpose of a high solid content. If a pretreated material is directly dried, a loose structure of the material will collapse, affecting the enzymatic hydrolysis efficiency of the cellulase. In the present invention, it is found through experiments that the drying operation (changing the water content) on the coarse particles of the pretreated material has less effect on the enzymatic hydrolysis whereas the enzymatic hydrolysis rate is sharply decreased after the fine particles are dried. In the method of the present invention, firstly the particle sizes of the biomass substrate are screened and then the water contents of the fine-coarse biomass substrate and the coarse-particle biomass substrate obtained by screening are separately controlled, and then the fine-coarse biomass substrate and the coarse-particle biomass substrate are mixed and the water content of the mixed substrate added to the enzymatic hydrolysis system is controlled, thus achieving a reduced initial viscosity of the enzymatic hydrolysis, increasing a liquefaction speed and finally improving the biomass high-solid enzymatic hydrolysis rate.

Compared with the prior arts, the method of improving a biomass high-solid enzymatic hydrolysis rate provided by the present invention further has the following features:

(1) The initial viscosity of the enzymatic hydrolysis system is low, the liquefaction speed is increased, and low requirements are proposed for the enzymatic hydrolysis equipment, thus saving energy consumption.

(2) The glucose concentration and the cellulose conversion rate of the enzymatic hydrolysis system both are increased, helping industrial production and applications.

(3) By controlling the water content of the material, the high-solid enzymatic hydrolysis system can be easily constructed. Thus, it is not necessary to achieve high substrate condition by batch feed, thus reducing complexity of the operation process.

BRIEF DESCRIPTION OF THE DRAWINGS

FIG. 1 is a schematic diagram illustrating comparison of results of comparative tests of enzymatic hydrolysis of an embodiment 10 of the present invention.

DETAILED DESCRIPTION OF THE EMBODIMENTS

In order to make the technical problems, the technical solutions and the beneficial effects of the present invention clearer, the present invention will be further described in details in combination with the drawings and embodiments. It should be understood that the specific embodiments described herein are used only to interpret the present invention rather than limit the present invention.

A preferred embodiment of a method of improving a biomass high-solid enzymatic hydrolysis rate according to the present invention may include the following steps.

At step 1, a biomass substrate with a water content of 50% to 70% is obtained by performing pretreatment on a biomass raw material, and the biomass substrate is screened through a mesh screen to obtain a coarse-particle biomass substrate above 10 meshes and a fine-particle biomass substrate below 10 to 50 meshes.

At step 2, a water content of the fine-particle biomass substrate is adjusted to 60% to 65% and a water content of the coarse-particle biomass substrate is adjusted to 50% to 70%, the fine-particle biomass substrate and the coarse-particle biomass substrate having different water contents are mixed to control a water content of the mixed substrate to 50% to 65%.

At step 3, the mixed substrate is placed into an enzymatic hydrolysis tank, and then a citrate buffer solution with pH 4.6 to 5.5 and a cellulase are added for enzymatic hydrolysis.

In step 3, a dry matter mass of the added mixed substrate is 15% to 25%; an amount of the added cellulase is 4%-6% of a dry matter mass in an enzymatic hydrolysis system; the added cellulase is novozymes Cellic CTec2; a control temperature of the enzymatic hydrolysis tank is 45° C. to 50° C.; a stirring speed of an stirring apparatus in the enzymatic hydrolysis tank is 50 rpm to 300 rpm; and an enzymatic hydrolysis time is 48 h to 96 h.

The biomass raw material includes corn stalk, corn cob, sugarcane bagasse and other agricultural and forestry residues.

The method of the present invention will be further described below in combination with specific embodiments.

Embodiment 1

The first embodiment of the method of improving a biomass high-solid enzymatic hydrolysis rate according to the present invention includes the following steps.

At step 11, corn cob residues with a water content of 70% (a cellulose content of 70%) were obtained by pretreatment.

At step 12, coarse and fine particle materials were obtained by using a 10-mesh screen and two materials above and below 10 meshes were dried at respective temperatures of 60° C. and 40° C.

At step 13, the coarse and fine particle materials obtained in step 12 were mixed in a proportion to control an entire water content of the mixed material to 60%.

If the water contents of the two materials above and below 10 meshes were controlled to 60%, the mixing proportion was 1:1; or, if the water content of the material above 10 meshes was controlled to 55%, and the water content of the material below 10 meshes was controlled to 65%, mixing proportion was 1:1; or, if the water content of the material above 10 meshes was controlled to 50%, and the water content of the material below meshes was controlled to 65%, the mixing proportion was about 3:7. The mixing was performed by analogy.

At step 14, the mixed material was added to a citrate buffer solution (pH4.6 to 5.5) to enable a dry matter mass of the enzymatic hydrolysis system to be 20%, and then cellulase Cellic CTec2 with a dry matter mass being 4% was added for enzymatic hydrolysis, where the control temperature of the enzymatic hydrolysis tank was 50° C., the stirring speed was 200 rpm, and the enzymatic hydrolysis time was 72 h.

Embodiment 2

The second embodiment of the method of improving a biomass high-solid enzymatic hydrolysis rate according to the present invention includes the following steps.

At step 21, corn cob residues with a water content of 50% (a cellulose content of 70%) were obtained by pretreatment.

At step 22, coarse and fine particle materials were obtained by using a 10-mesh screen and a 50-mesh screen. The material above 10 meshes was dried at a temperature of 50° C., and the material of from 10 meshes to 50 meshes and the material below 50 meshes were dried respectively at a temperature of 30° C.

At step 23, the coarse and fine particle materials obtained at step 22 were mixed in a proportion to control the entire water content of the pretreated material to 50%.

The control on the water contents of the three materials and the mixing proportion can be referred to the method in step 13 of the first embodiment.

At step 24, the mixed material was added to a citrate buffer solution (pH4.6 to 5.5) to enable a dry matter mass of the enzymatic hydrolysis system to be 20%, and then cellulase Cellic CTec2 with a dry matter mass being 5% was added for enzymatic hydrolysis, where the control temperature of the enzymatic hydrolysis tank was 45° C., the stirring speed was 180 rpm, and the enzymatic hydrolysis time was 48 h.

Embodiment 3

The third embodiment of the method of improving a biomass high-solid enzymatic hydrolysis rate according to the present invention includes the following steps.

At step 31, corn cob residues with a water content of 70% (a cellulose content of 70%) were obtained by pretreatment.

At step 32, coarse and fine particle materials were obtained by using a 10-mesh screen, a 30-mesh screen and a 50-mesh screen. The material above 10 meshes was dried at a temperature of 70° C., and the material of from 10 meshes to 30 meshes, the material of from meshes to 50 meshes and the material below 50 meshes were dried respectively at a temperature of 40° C.

At step 33, the coarse and fine particle materials obtained in step 32 were mixed in a proportion to control an entire water content of the pretreated material to 65%.

At step 34, the mixed material was added to a citrate buffer solution (pH4.6 to 5.5) to enable a dry matter mass of the enzymatic hydrolysis system to be 20%, and then cellulase Cellic CTec2 with a dry matter mass being 6% was added for enzymatic hydrolysis, where the control temperature of the enzymatic hydrolysis tank was 50° C., the stirring speed was 180 rpm, and the enzymatic hydrolysis time was 96 h.

Embodiment 4

The operation steps of the embodiment are same as in the first embodiment.
Compared with the first embodiment, the dry matter mass of the enzymatic hydrolysis system is 15%.

Embodiment 5

The operation steps of the embodiment are same as in the second embodiment. Compared with the second embodiment, the dry matter mass of the enzymatic hydrolysis system is 15%.

Embodiment 6

The operation steps of the embodiment are same as in the third embodiment.
Compared with the third embodiment, the dry matter mass of the enzymatic hydrolysis system is 15%.

Embodiment 7

The operation steps of the embodiment are same as in the first embodiment. Compared with the first embodiment, the dry matter mass of the enzymatic hydrolysis system is 25%.

Embodiment 8

The operation steps of the embodiment are same as in the second embodiment. Compared with the second embodiment, the dry matter mass of the enzymatic hydrolysis system is 25%.

Embodiment 9

The operation steps of the embodiment are same as in the third embodiment. Compared with the third embodiment, the dry matter mass of the enzymatic hydrolysis system is 25%.

Control Embodiment 1

The control embodiment includes the following steps.
At step (11), corn cob residues with a water content of 70% (a cellulose content of 70%) were obtained by pretreatment.
At step (12), the pretreated material was added to a citrate buffer solution (pH4.6 to 5.5) to enable a dry matter mass of the enzymatic hydrolysis system to be 20%, and then cellulase Cellic CTec2 with a dry matter mass being 4% was added for enzymatic hydrolysis, where the control temperature of the enzymatic hydrolysis tank was 50° C., the stirring speed was 200 rpm, and the enzymatic hydrolysis time was 72 h.

Control Embodiment 2

The control embodiment includes the following steps.
At step (21), corn cob residues with a water content of 70% (a cellulose content of 70%) were obtained by pretreatment.
At step (22), the pretreated material was dried at a temperature of 60° C. to control a water content of the material to 60%.
At step (23), the pretreated material was added to a citrate buffer solution (pH4.6 to 5.5) to enable a dry matter mass of the enzymatic hydrolysis system to be 20%, and then cellulase Cellic CTec2 with a dry matter mass being 4% was added for enzymatic hydrolysis, where the control temperature of the enzymatic hydrolysis tank was 50° C., the stirring speed was 200 rpm, and the enzymatic hydrolysis time was 72 h.

Control Embodiment 3

The control embodiment includes the following steps.
At step (31), corn cob residues with a water content of 70% (a cellulose content of 70%) were obtained by pretreatment.
At step (32), the pretreated material was dried at a temperature of 60° C. to control a water content of the material to 65%.
At step (33), the pretreated material was added to a citrate buffer solution (pH4.6 to 5.5) to enable a dry matter mass of the enzymatic hydrolysis system to be 15%, and then cellulase Cellic CTec2 with a dry matter mass being 4% was added for enzymatic hydrolysis, where the control temperature of the enzymatic hydrolysis tank was 50° C., the stirring speed was 200 rpm, and the enzymatic hydrolysis time was 72 h.

Control Embodiment 4

The control embodiment includes the following steps.
At step (41), corn cob residues with a water content of 70% (a cellulose content of 70%) were obtained by pretreatment.
At step (42), the pretreated material was dried at a temperature of 60° C. to control a water content of the material to 55%.
At step (43), the pretreated material was added to a citrate buffer solution (pH4.6 to 5.5) to enable a dry matter mass of the enzymatic hydrolysis system to be 25%, and then cellulase Cellic CTec2 with a dry matter mass being 4% was added for enzymatic hydrolysis, where the control temperature of the enzymatic hydrolysis tank was 50° C., the stirring speed was 200 rpm, and the enzymatic hydrolysis time was 72 h.

Control Embodiment 5

The operation steps of the control embodiment are same as in the first control embodiment. Compared with the first control embodiment, the dry matter mass of the enzymatic hydrolysis system is 15%.

Control Embodiment 6

The operation steps of the control embodiment are same as in the first control embodiment. Compared with the first control embodiment, the dry matter mass of the enzymatic hydrolysis system is 25%.

The enzymatic hydrolysis processes and the enzymatic hydrolysis effects of the embodiments 1 to 9 and the control embodiments 1 to 6 are observed. After the enzymatic hydrolyses, the glucose contents of the enzymatic hydrolysates are measured by using high performance liquid chromatography and the cellulose conversion rates are also calculated, with results shown in Tables 1 to 3.

TABLE 1

Enzymatic hydrolyses of materials of different particle sizes under 20% high-solid system

| Screening particle sizes of the materials | Initial viscosity (mPa · s) | Liquefaction time (h) | Glucose concentration (g/L) | Cellulose conversion rate (%) |
|---|---|---|---|---|
| Embodiment 1 (above 10 meshes and below 10 meshes) | $3.3 \times 10^6$ | 40 | 112.0 | 72.0 |
| Embodiment 2 (above 10 meshes, 10 to 50 meshes, and below 50 meshes) | $3.1 \times 10^6$ | 36 | 116.7 | 75.0 |
| Embodiment 3 (above 10 meshes, 10 to 30 meshes, 30 to 50 meshes, and below 50 meshes) | $2.7 \times 10^6$ | 34 | 113.6 | 73.0 |
| Control embodiment 2 (no screening under 60% water content conditions) | $4.3 \times 10^6$ | 45 | 107.6 | 69.2 |
| Control embodiment 1 (no drying and no screening) | $1.5 \times 10^7$ | 46 | 102.5 | 65.9 |

TABLE 2

Enzymatic hydrolyses of materials of different particle sizes under 15% high-solid system

| Screening particle sizes of the materials | Initial viscosity (mPa · s) | Liquefaction time (h) | Glucose concentration (g/L) | Cellulose conversion rate (%) |
|---|---|---|---|---|
| Embodiment 4 (above 10 meshes and below 10 meshes) | $3.6 \times 10^5$ | 22 | 93.3 | 80.0 |
| Embodiment 5 (above 10 meshes, 10 to 50 meshes, and below 50 meshes) | $3.2 \times 10^5$ | 18 | 96.8 | 83.0 |
| Embodiment 6 (above 10 meshes, 10 to 30 meshes, 30 to 50 meshes, and below 50 meshes) | $2.9 \times 10^5$ | 16 | 98.0 | 84.0 |
| Control embodiment 3 (no screening under 65% water content conditions) | $4.8 \times 10^5$ | 24 | 91.0 | 78.0 |
| Control embodiment 5 (no drying and no screening) | $1.7 \times 10^6$ | 25 | 90.5 | 77.6 |

TABLE 3

Enzymatic hydrolyses of materials of different particle sizes under 25% high-solid system

| Screening particle sizes of the materials | Initial viscosity (mPa · s) | Liquefaction time (h) | Glucose concentration (g/L) | Cellulose conversion rate (%) |
|---|---|---|---|---|
| Embodiment 7 (above 10 meshes and below 10 meshes) | $4.4 \times 10^6$ | 54 | 126.4 | 65.0 |
| Embodiment 8 (above 10 meshes, 10 to 50 meshes, and below 50 meshes) | $2.8 \times 10^6$ | 52 | 130.3 | 67.0 |
| Embodiment 9 (above 10 meshes, 10 to 30 meshes, 30 to 50 meshes, and below 50 meshes) | $2.1 \times 10^6$ | 48 | 138.4 | 68.0 |
| Control embodiment 4 (no screening under 55% water content conditions) | $2.9 \times 10^7$ | 60 | 116.7 | 60.0 |
| Control embodiment 6 (no drying and no screening) | $3.5 \times 10^7$ | —* | 106.2 | 54.6 |

Notes:
*the initial material viscosity of the enzymatic hydrolysis is extremely large and free water is extremely small. After 72 h, the material is still presented as muddy and has no obvious liquefaction phenomenon.

It can be seen from Table 1 that, under the 20% high-solid system, control on the water content of the material can lower the initial viscosity of the enzymatic hydrolysis, greatly promote the system liquefaction, increase the enzymatic hydrolysis effect and improve the cellulose conversion rate. The result shows that, the finer the particle size grading is, the better the enzymatic hydrolysis effect is. The reason is that, at a low temperature, the water content of the fine particles is controlled or the fine particles do not change the water content, such that the pretreated material has the property of looseness and porosity, helping the enzymatic hydrolysis of the cellulase. If the water content is directly controlled without performing particle size screening, the water contents of different particle sizes will be controlled greatly differently, and the fine particle structure is easy to collapse, affecting the subsequent enzymatic hydrolysis effect.

It can be seen from Table 2 that under the 15% high-solid system, screening particle size and controlling water content can lower the initial water content and increase the enzymatic hydrolysis efficiency with its trend similar to that of the 20% system: the finer the particle size grading is, the better the enzymatic hydrolysis effect is.

It can be seen from Table 3 that under 25% high-solid system, if water content control is not performed, the enzymatic hydrolysis efficiency is extremely low and the operability is also low; if water content is directly controlled without performing screening, the system liquefaction is slow and the entire enzymatic hydrolysis rate is not high; after particle size screening and batch management on water content are performed, the initial viscosity of the enzymatic hydrolysis obviously decreases but the liquefaction speed is increased, and the cellulose conversion rate is also increased. Further, it is shown that the more the particle size grades are, the better the enzymatic hydrolysis effect is.

Embodiment 10

Comparative tests were performed for the enzymatic hydrolyses of the materials of different particle sizes under different water contents, and the operations steps are shown below.

At step ①, corn cob residues with a water content of 70% (a cellulose content of 70%) were obtained by pretreatment.

At step ②, the material was dried in a drying oven of 60° C. to control the water content respectively to 65%, 60%, 55% and 50%.

At step ③, the materials were all screened using a 10-mesh screen, and the material above 10 meshes, the material below 10 meshes and the mixed material were enzymatically hydrolyzed. 1 kg of system was constructed with a dry matter mass of 20%, and cellulase Cellic CTec2 with a dry matter mass being 4% was added for enzymatic hydrolysis. The control temperature of the enzymatic hydrolysis tank was 50° C., the stirring speed was 200 rpm, and the enzymatic hydrolysis time was 72 h.

The enzymatic hydrolysis processes and the enzymatic hydrolysis effects were observed. At the same time, a glucose concentration in the enzymatic hydrolysate was detected and the cellulose conversion rate was calculated, with results shown in drawing 1.

It can be seen from FIG. 1 that under 60% water content state, the enzymatic hydrolysis effect of the material is optimal: the water content of the fine particles (below 10 meshes) have greater effect on the enzymatic hydrolysis effect and the coarse particles (above meshes) have less effect.

The above descriptions are made only to preferred embodiments of the present invention and such embodiments are not intended to limit the present invention. Any modifications, equivalent substitutions and improvements made within the spirit and principle of the present invention shall all be encompassed into the scope of protection of the present invention.

The invention claimed is:

1. A method of improving a biomass high-solid enzymatic hydrolysis rate, comprising the following steps:
   at step 1, obtaining a biomass substrate with a water content of 50% to 70% by weight by performing pretreatment on a biomass raw material, and screening the biomass substrate through a mesh screen to obtain a coarse-particle biomass substrate above 10 meshes and a fine-particle biomass substrate from 10 to 50 meshes;
   at step 2, adjusting a water content of the fine-particle biomass substrate to 60% to 65% by weight and a water content of the coarse-particle biomass substrate to 50% to 70% by weight, and mixing the fine-particle biomass substrate and coarse-particle biomass substrate having different water contents to obtain a mixed substrate having a water content of 50% to 65% by weight;
   at step 3, placing the mixed substrate into an enzymatic hydrolysis tank, and then adding a citrate buffer solution with pH 4.6 to 5.5 and a cellulase for enzymatic hydrolysis.

2. The method of claim 1, wherein in step 3, a dry matter mass of the added mixed substrate is 15% to 25%.

3. The method of claim 1, wherein, in step 3, an amount of the added cellulase is 4%-6% of a dry matter mass in an enzymatic hydrolysis system.

4. The method of claim 1, wherein, in step 3, the added cellulase is Cellic CTec2.

5. The method of claim 1, wherein, in step 3, a control temperature of the enzymatic hydrolysis tank is 45° C. to 50° C., a stirring speed of an stirring apparatus in the enzymatic hydrolysis tank is 50 rpm to 300 rpm, and an enzymatic hydrolysis time is 48 h to 96 h.

* * * * *